UNITED STATES PATENT OFFICE.

HEINRICH HEIMANN, OF DESSAU, GERMANY, ASSIGNOR TO ACTIEN GESELLSCHAFT FÜR ANILIN-FABRIKATION, OF BERLIN, GERMANY.

SULFUR DYES AND THEIR MANUFACTURE.

1,251,368.  Specification of Letters Patent.  Patented Dec. 25, 1917.

No Drawing.  Application filed January 21, 1915. Serial No. 3,605.

*To all whom it may concern:*

Be it known that I, HEINRICH HEIMANN, a citizen of the German Empire, residing at Dessau, Germany, my P. O. address being Friedrich-Schneiderstrasse 63, Dessau, Germany, have invented certain new and useful Improvements in Sulfur Dyes and Their Manufacture, of which the following is a specification.

It has been found that new valuable sulfurized dyes can be obtained by the action of sulfur upon a mixture of an amino-, diamino-, nitrohydroxy- and aminooxy-azo-compound with a C-alkylated diamin of the benzene- and naphthalene series. Thus for instance according to my invention a mixture of meta-toluylenediamin or para-toluylenediamin or xylylenediamin, etc., or of a N-aryl-derivative of these diamins, such as for instance a napthyl-meta-toluylenediamin or the corresponding, or of a nitroamin with amino-azo-benzene, benzene-azo-beta-naphthylamin, or benzene-azo-alpha-naphthylamin, etc., may be acted upon with sulfur. Furthermore mixtures of meta-toluylenediamin with a benzene-azo-phenol or with a benzene-azo-naphthol may be brought into reaction with sulfur according to my invention.

The new sulfur dyes thus obtained possess a beautiful shade and are very fast to washing and against boiling diluted acids. The tints obtained with these new dyes are numerous; they vary, generally speaking, from beautiful olives to beautiful reddish browns or black browns or brownish orange.

The following examples serve to illustrate the invention, the parts being by weight:

(1.) 12 parts of meta-toluylenediamin, 20 parts of amino-azo-benzene and 80 parts of sulfur are heated together during about 4 hours upon say 180-230° C. and then during about 1 to 2 hours to say 230-260° C. The melt thus obtained is rendered soluble in the usual way by treating it with a concentrated solution of sodium sulfid. The new dye may be separated as usually for instance by introducing a current of air; it produces on unmordanted cotton in a dyebath containing an alkali metal sulfid beautiful olive shades which are fast to washing and to boiling diluted acids.

(2.) A mixture of 10 parts of meta-toluylenediamin, 20 parts of benzene-azo-beta-naphthylamin and of 50 parts of sulfur is heated during about 2-4 hours to say 180 to 220° C. and then during say 4-8 hours for instance to 220-260° C. The new dye may be rendered soluble and separated as indicated in example (1); it dyes unmordanted cotton a beautiful reddish brown fast to washing and diluted boiling acid.

In a similar manner from a mixture of meta-toluylene-diamin and benzene-azo-alpha-naphthylamin a beautiful brown dye is obtained the dyeings of which are fast to washing and to boiling dilute acids. The new dye in the dry state when pulverized forms a dark brown powder, which is insoluble or nearly insoluble in the usual organic solvents and difficultly soluble in concentrated sulfuric acid to a black brown solution which is decolorized on the addition of aluminium powder.

It is obvious that the present invention is not limited to the foregoing examples or to the details given therein.

Thus it may be stated that the shades of the dyes obtainable according to my invention depend also, generally speaking, upon the proportions of the ingredients as well as upon other special conditions of reaction, such as for instance the temperatures of reaction and the duration of heating. Furthermore it is not necessary to use in all cases the different ingredients in a pure form. Thus for instance when using a hydroxy-azo-compound derived from a cresol, for instance para-nitrobenzene-azo-cresol, the hydroxy-azo-compound may be used which is obtained by combining para-nitrodiazobenzene with a crude cresol containing the ortho- as well as the meta- and paracresol. The tints thus obtained, generally speaking, are very similar.

Having now described my invention what I claim is,—

1. New sulfurized dyes, which can be obtained by the action of sulfur upon a mixture of an amino derivative of the benzene-azo-naphthalene series with a C-alkylated diamin of the aromatic series, the tints of which vary from beautiful olives to beautiful browns, the shades obtained on unmordanted cotton with the aid of the new dyes being, generally speaking, very fast to washing and to diluted boiling acids, and these new dyes being insoluble or nearly insoluble in the usual organic solvents and difficultly soluble in concentrated sulfuric acid, but easily soluble in an aqueous solution of an alkali metal sulfid and in an alkaline solution of a hydrosulfite.

2. New sulfurized dyes, which can be obtained by the action of sulfur upon a mixture of a benzene-azo-naphthylamin with a C-alkylated diamin of the benzene series the tints of which vary from beautiful olives to beautiful browns, the shades obtained on unmordanted cotton with the aid of the new dyes being, generally speaking, very fast to washing and to diluted boiling acids, and these new dyes being insoluble or nearly insoluble in the usual organic solvents and difficultly soluble in concentrated surfuric acid, but easily soluble in an aqueous solution of an alkali metal sulfid and in an alkaline solution of a hydrosulfite.

3. A new sulfurized dye, which can be obtained by the action of sulfur upon a mixture of benzene-azo-alpha-napththylamin with meta-toluylenediamin, which new dye in the dry state and pulverized forms a dark brown powder, insoluble or nearly insoluble in the usual organic solvents and difficultly soluble in concentrated sulfuric acid to a black brown solution, which is decolorized on the addition of aluminium powder, this new dye being readily soluble in an aqueous solution of an alkali metal sulfid and in an alkaline hydrosulfite solution, and which new dye produces on unmordanted cotton from a dye-bath containing an alkali metal sulfid a beautiful brown tint fast to washing and to boiling diluted acids.

4. The hereinbefore-described manufacture of new sulfurized dyes by acting with sulfur upon a mixture of an amino-derivative of the benzene-azo-naphthalene-series with a C-alkylated diamin of the benzene-series.

5. The hereinbefore-described manufacture of new sulfurized dyes by acting with sulfur upon a mixture of a benzene-azo-naphthylamin with meta-toluylenediamin.

In testimony whereof I have hereunto set my hand in presence of two subscribing witnesses.

HEINRICH HEIMANN.

Witnesses:
ARTHUR REILLY,
L. OEHLMANN.